S. T. BACON.
APPARATUS FOR GENERATING CARBONIC ACID GAS.
No. 61,596. Patented Jan. 29, 1867.
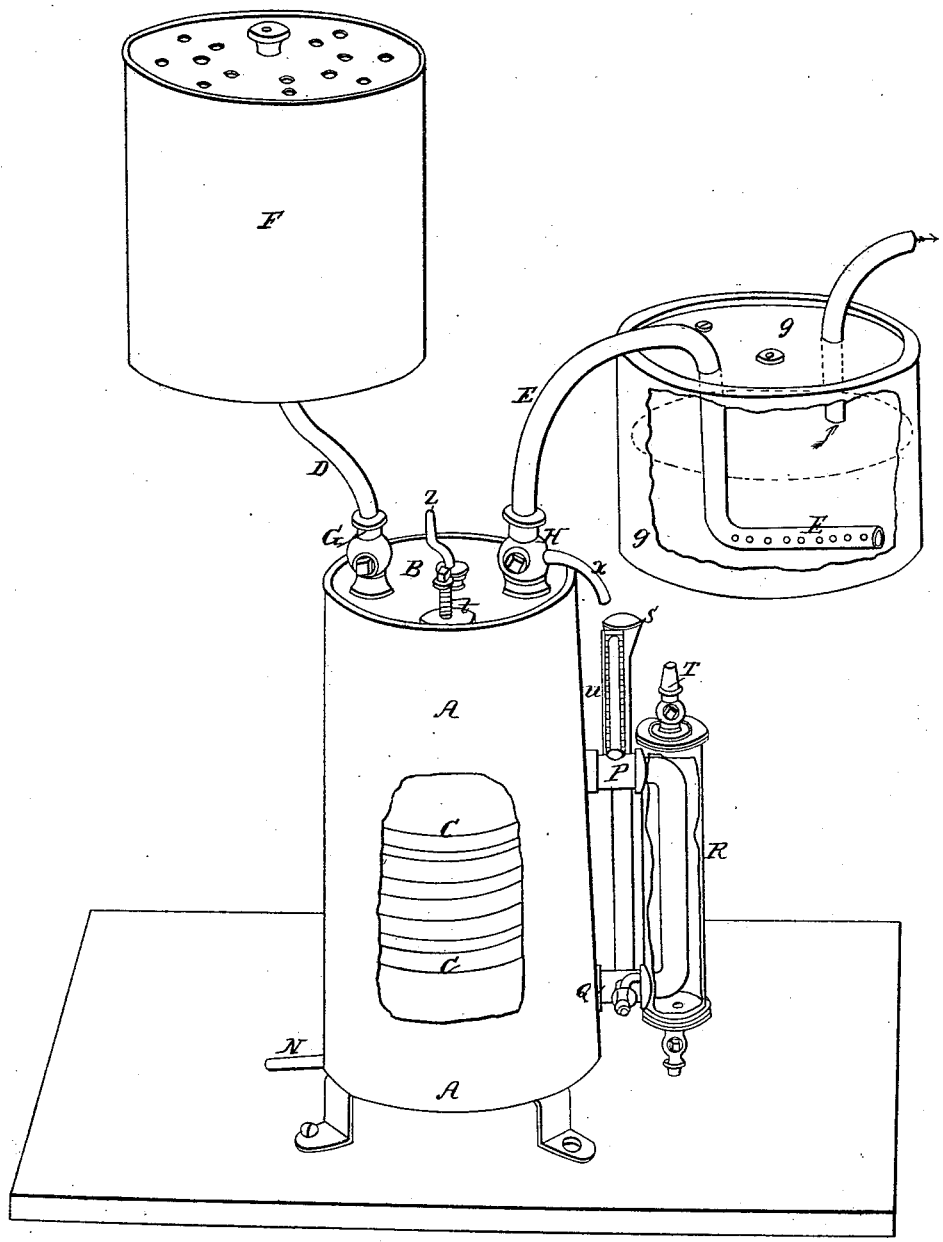

United States Patent Office.

STEUBEN T. BACON, OF BOSTON, MASSACHUSETTS.

Letters Patent No. 61,596, dated January 29, 1867; antedated January 17, 1867.

---

IMPROVED APPARATUS FOR GENERATING CARBONIC ACID GAS.

---

The Schedule referred to in these Letters Patent and making part of the same.

---

TO ALL WHOM IT MAY CONCERN:

Be it known that I, STEUBEN T. BACON, of Boston, in the county of Suffolk, and State of Massachusetts, have invented a new and improved arrangement of Apparatus for Generating Carbonic Acid Gas for bread-making; and I do hereby declare that the following, when taken in connection with the drawings, which accompany and form part of this specification, is a description of my invention sufficient to enable those skilled in the art to practise it.

In the manufacture of ærated bread according to the system known as Dr. Danglish's, and for which British Letters Patent were granted, dated October 1, 1856, and numbered 2,293, it has been generally the practice to employ carbonic acid gas obtained from the action of sulphuric acid upon chalk or marble, and leaving a waste residuum of little or no value.

This invention relates to the arrangement of apparatus, herein described, for the production of carbonic acid gas for the manufacture of ærated bread, said gas being made from material of which the residuum, after the gas is evolved therefrom, can be utilized for wine, beer, or vinegar-making, or for spirit-distilling, according to circumstances, the value of such secondary products paying for the cost of the material and the labor involved, thus giving the carbonic acid gas at little or no cost, and of a quality for bread-making much superior to that evolved by the employment of sulphuric acid.

The material from which, in the apparatus to be described, the carbonic acid gas is to be evolved, may be varied according to circumstances, generally governed by locality. Thus, in some cases, grapes or other fruits prepared for wine-making, may be used; in others, certain roots, such as beets and potatoes; also certain grains or malt; also molasses or the residuum obtained in the manufacture and refining of sugar; also waste material not fitted for food and obtained in the preparation of flour from grain, such as bran or shorts, the sweepings of mills, or refuse from bakeries, all duly prepared by mashing with warm water or otherwise suited for undergoing fermentation according to established usage.

The apparatus in the arrangement of which my invention consists is shown in one perspective view, parts thereof being represented as broken away to illustrate interior construction.

A is a fermenting tun of any convenient size, but preferably made small and cylindrical or frusto-conical, the better to enable it to withstand the internal pressure of the generated gas. Contrary to the usual practice the tun A is fitted with a head, B, so that the tun is air-tight instead of being open at the top. In this head are fitted two pipes, D and E. The pipe D is for conveyance of the mash, grape or other fruit juice, or other liquid which is to undergo fermentation, from the vat F into the tun A, the communication between the vat F and the tun A being controlled by a stop-cock, G. Where the matter to be fermented is of such form that it cannot be conveniently passed through the pipe D and the stop-cock G it can be introduced into the tun A through an opening which is provided with a cover, as seen at V. The pipe E is fitted at H with a three-way cock, and is for the passage of the carbonic acid gas, produced by fermentation, into the purifier I, which is a close vessel, kept about three-fourths full of water, into and beneath which the pipe E dips by bending, as shown, and distributes and discharges the gas through a series of small holes. The gas, then rising through the water, is washed and purified thereby, and accumulates in the top of the vessel I, from whence it may be conducted off into any suitable receiver. In the bottom of the tun A is fitted a valve, the handle of which is seen at N, said valve being for the discharge of the spent wash or material after it has undergone fermentation, which material may be conveyed away for further treatment according as the same is intended for wine, beer, vinegar, or spirit-making. Within the tun is fitted an attemperator, which may consist of a coil of metal pipe, C. The upper end of this coil is brought out through the side of the tun at P, and the lower end at Q, and then these ends are connected by a vertical pipe, which is surrounded by the cylinder or jacket R. The coil C is kept filled with water by means of the stand pipe S, and the water in the coil may be warmed and caused to circulate by introducing steam through the cock T into the jacket R. The temperature of the water in the coil may be regulated upon observation of the thermometer, shown at U. In warm climates or in warm weather, when the temperature of the fermenting material may require to be reduced, cold water may be made to circulate through the coil, instead of warm, by making the necessary pipe connections for the purpose.

The operation of this apparatus, as arranged, is as follows:

The juice or other liquid, or semi-liquid material about to be submitted to fermentation, having been prepared in the vat F, it is admitted into the tun A through the pipe D and cock G. The three-way cock H is to be so turned as to communicate with the outer air through the pipe $x$, to allow of the escape of gas or air displaced by the entering material. When the proper quantity of liquid has been run into the tun the cock G is closed, and the communication with the air through $x$ is allowed to remain open until after fermentation has commenced and carbonic acid gas is being produced, which, as it rises from the surface of the liquid, will displace the air which occupies the upper part of the tun. When the operator perceives the carbonic acid gas coming through pipe $x$ he will turn the cock H so as to shut the communication with the outer air and open it between the tun A and the purifier I, and the process of fermentation will then be allowed to proceed until the contents of the tun are exhausted of carbonic acid gas, this passing off through the purifier to a gas-holder. A stirrer within the tun may be worked by means of the handle seen at $z$, to facilitate the escape of the gas from the contents of the tun, and the generation of the gas is accelerated or retarded by the use of the attemperator.

*Claim.*

I claim the arrangement herein described of the apparatus for facilitating the generation of carbonic acid gas from saccharine or farinaceous matter.

In witness whereof I have hereunto set my hand this third day of November, A. D. 1865.

S. T. BACON.

Witnesses:
F. GOULD,
J. B. COLLIN.